United States Patent Office 3,733,407
Patented May 15, 1973

3,733,407
MENOPAUSE TREATMENT
Eugene J. Segre, Los Altos, Calif., assignor to Syntex Corporation, Panama, Panama
No Drawing. Filed Aug. 25, 1971, Ser. No. 174,934
Int. Cl. A61k 17/00
U.S. Cl. 424—239
14 Claims

ABSTRACT OF THE DISCLOSURE

A method for relieving or preventing menopausal symptoms by use of a graded sequential estrogen-progestogen regimen.

The present invention relates to novel compositions and methods useful for relieving or preventing symptoms associated with the menopause and the perimenopausal interval. More particularly, the present invention is directed to relieving or preventing menopausal or perimenopausal symptoms in the female human by use of a graded sequential estrogen-progestogen regimen.

The female physiologic climacteric is well documented. The treatment of the climacteric or, more commonly, menopause has largely concentrated on the distressing sysmptoms associated therewith, e.g. hot flushes (or flashes), headache, insomnia, fatigue, nervousness, depression, joint pains, and so forth. The administration of female hormones has been recommended since the menopause can be regarded as a deficiency state with respect to the production of those hormones. Estrogens, both synthetic and natural, have been used. Efforts to replace both types of deficient hormones, namely estrogen and progestogen, have often relied on the commonly available oral contraceptive regimens, i.e. combined and sequential. These regimens lack flexibility, do not approach the physiological estrogen and progestogen levels of the natural ovarian cycle, and may be responsible for some intolerance because of relative excesses of the components.

The present invention avoids problems inherent in the remedies heretofore employed in the treatment of menopause. The present invention provides a totally new concept which relieves or prevents the symptoms characteristic of menopause and the perimenopausal interval by means of a graded sequential regimen of estrogen and progestogen.

The present invention provides a method useful for relieving or preventing menopausal or perimenopausal symptoms in a female human which comprises subjecting said human to a graded sequential estrogen-progestogen regimen during a cycle ranging from about 21 to about 35 days, said regimen comprising:

(a) The estrogen continuously administered from a day selected from about the first seven of said cycle to a day selected from about the last seven of said cycle, in an effective amount, with gradually increasing daily doses to a first peak dose in about the middle of the estrogen administration period, said first peak dose comprising from about 10 to about 20 percent of the total amount of said estrogen administered during said cycle, and gradually decreasing daily doses from said first peak, and optionally a second peak dose after said first peak dose comprising from about 50 to about 70 percent of said first peak dose; and (b) The progestogen administered concomitantly with said estrogen entirely or in major part after the estrogen first peak dose in a total amount sufficient to induce pseudomenstruation, optionally with a peak dose of about 50 to about 70 percent of the total amount of said progestogen administered.

The present invention, in a second aspect, provides a composition useful for relieving or preventing menopausal or perimenopausal symptoms in a female human which comprises graded sequential estrogen-progestogen components in admixture with a pharmaceutically acceptable non-toxic carrier, said components arranged in a regimen suitable for administration as described above.

While not intending to be bound by any theoretical explanation of the mechanism of action herein, it is believed that the administration of the graded sequential estrogen-progestogen regimen hereof provides relief or prevention of menopausal or perimenopausal symptoms by creating a reproduction of physiological hormone balance of estrogen and progestogen. Thus, the composition and method hereof is generally useful in the treatment of patients who suffer from a hormone imbalance or deficiency by means of true replacement therapy and provides a method which can be indicated whenever signs or symptoms of hormone deficiencies are present.

The method of the present invention can be further illustrated by reference to the following:

Figure 1

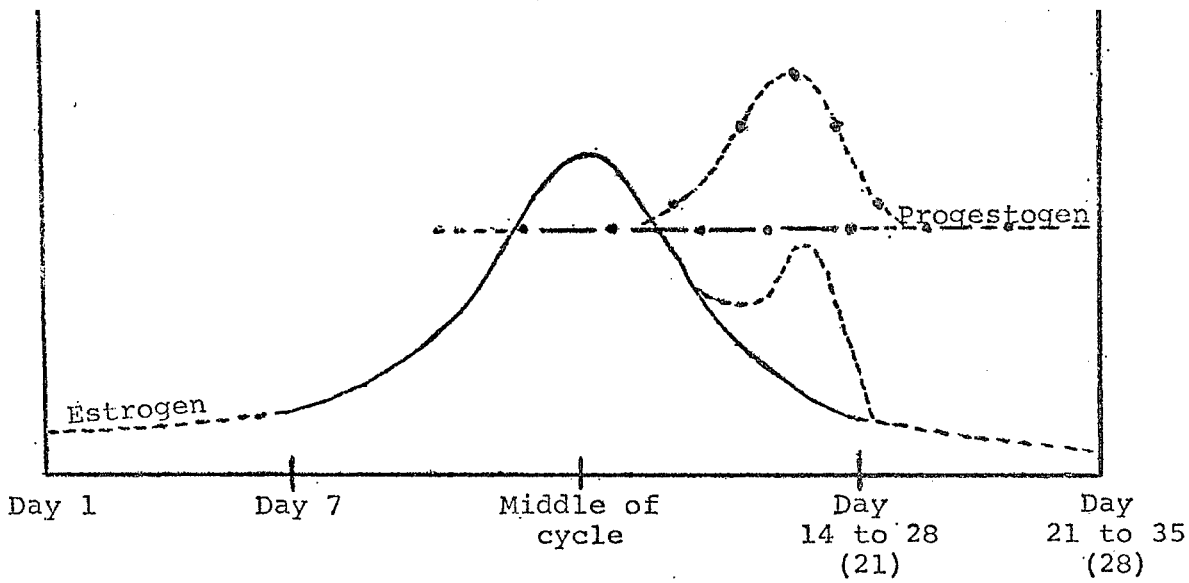

ONE TREATMENT CYCLE

With reference to FIG. 1, the continuous dotted (- - - - -) and continuous solid (—) lines refer to the estrogen administration portion of the regimen hereof while the interrupted dotted (- - - · - - - · - -) and interrupted solid (— · — · —) refer to the progestogen administration portion of the regimen hereof. For each of said portions, the dotted lines refer to optional phases and the solid lines refer to required phases.

Thus, in a given cycle of from 21 to 35 days in length, the estrogen administration is begun during one of the first seven days and ended during one of the last seven days of the cycle—hence the continuous dotted (- - - -) lines during these two periods. Once begun, the estrogen administration is continuous—hence the continuous solid (—) lines from day 7 to day 14 to 28—and it includes a peak dose in about the middle of the administration period of a magnitude of about 10 to about 20 percent of the total amount administered—hence the use of the bell-shaped curve

This illustrates that the peak dose can occur over a single or several day period about in the middle of the administration period, the area under the peak dose curve approximating 10 to 20 percent of the area under the entire estrogen administration curve.

The optional second peak dose is indicated by the continuous dotted bell shaped

curve occurring after the first peak dose. It also is variable over a single or several day period and the area thereunder approximates 50 to 70 percent of the area under the first peak dose curve. The absence of this optional second peak dose is indicated by a continuance of the decreasing dosages from the first peak dose to day 14 to 28 and optionally onward to day 21 to 35.

The progestogen curves are elevated above the estrogen curves to illustrate the larger dosages involved, as discussed infra. The interrupted solid (— · — · —) lines indicate the administration of progestogen entirely or in major part after the estrogen first peak dose—hence the use of the interrupted dotted (- · - - - · —) line at about the middle of the cycle—and concomitantly with the estrogen administration—hence the use of a similar dotted line (— · — · —) from day 14 to 28 onward to the end of the cycle.

Thus, the required period of administration of progestogen is from about the first peak dose to the end of the estrogen administration as indicated by the interrupted solid lines.

The optional peak dose of progestogen is indicated by the interrupted dotted bell shaped curve

the area thereunder approximating 50 to 70 percent of the area under the curve representing the total amount of progestogen administered and being variable over a single to several day period, at about the same time as the estrogen optional second peak dose.

The sequential characteristic of the present invention is indicated herein by the progestogen being entirely or in major part administered after the (first) peak dose of estrogen. The graded characteristic of the present invention is indicated herein by the estrogen, and optionally the progestogen, being administered in gradually increasing and decreasing doses around a first peak dose, and, for the estrogen, optionally around a second peak dose.

It will be understood that the individual "cycles" referred to herein are suitable recurring, that is, continuous over a period of time recommended for proper treatment of the subject(s).

In the present specification and claims, the term "relieving or preventing" refers to the fact that, depending upon the state of the patient when the method hereof is begun, the symptoms may or may not be experienced. Thus, the method hereof can be practiced to relieve symptoms already evident or as prophylactic thereapy to prevent them from occurring.

The term "menopausal or perimenopausal" refers to the events leading to and associated with the cessation of menstruation, whether naturally or artificially occurring. Commonly this state begins between the ages of 40 to 50 in the human female, and may continue for weeks to months or even years thereafter.

The "symptoms" associated with the menopause and the perimenopause interval are inclusive of hot flushes, nervousness, depression, and so forth, and other, perhaps resultant, conditions such as atherosclerosis and osteoporosis.

The estrogen useful as herein described can be selected from any of those materials commonly known as and referred to as estrogenic agents or as materials which possess estrogenic activity and is exemplified by mestranol, ethynylestradiol, and conjugated estrogen. By the term "effective amount," with respect to the estrogen dosage herein, is meant a total amount ranging from about 300 mcg. to about 75 mg. per cycle. It will be understood that the relative estrogen potencies of the various estrogens useful herein vary by factors known in the art. Thus, an effective amount herein of mestranol or ethynylestradiol ranges from about 300 mcg. to about 1500 mcg. and preferably from about 400 mcg. to about 800 mcg. An effective amount herein of conjugated estrogen ranges from about 15 mg. to about 75 mg. and preferably from about 20 mg. to about 40 mg.

The progestogen useful as herein described can be selected from those progestogens which are useful for fertility control, i.e. ethynodiol diacetate, norethynodrel, norethindrone, norethindrone acetate, dimethisterone, norgestrel, medroxyprogesterone acetate, chlormadinone acetate, and so forth, and is exemplified by norethindrone.

By the term "an amount sufficient to induce pseudomenstruation" is meant that amount which will result in withdrawal bleeding, as commonly defined, when the progestogen administration is stopped. This amount will vary over a wide range depending upon the selection of progestogen. Generally, the amount ranges from about 7.5 to about 140 mg., preferably from about 10 to about 20 mg.

The process of the present invention is conventionally practiced by oral administration of the graded sequential components, suitably in admixture with a pharmaceutically acceptable non-toxic carrier. Thus, the components can be appropriately compounded in any pharmaceutically acceptable non-toxic form and can be packaged in any system convenient for proper delivery. For example, the formulations can take the form of tablets, capsules, and pills containing, in addition to active ingredient, a number of inert materials including diluents, binders, lubricants and other additives designed to improve physical characteristics. See Remington's Pharmaceutical Sciences, Mack Publishing Co., Easton, Pa., 14th Edition, 1970, especially Chapter 87. Dispensing systems useful herein include those which accommodate conventional packaging equipment, such as transparent strip foil packages contiguously arranged in daily doses or other conventional means known in the art.

The following example serves to further illustrate the present invention.

EXAMPLE

A total of 157 women (mostly in the 45 to 55 age range) were selected for a trial study. All complained of the characteristic hot flushes and other symptoms of the menopause. Of these, 120 completed the double-blind schedule as programmed, and described infra.

To confirm comparability of the subjects, the following pre-treatment characteristics were analyzed: age, bilateral ovariectomy, hysterectomy, prior estrogen therapy; prior uterine bleeding; and onset, duration, frequency and severity of hot flushes. No statistically significant differences in any of these characteristics could be detected among the subjects which were randomly assigned to three test groups.

Medication was allotted at random to these two active and one placebo (i.e. no estrogen or progestogen administered) groups. The active regimens contained an estrogen, mestranol, at one of two dosage levels, and norethindrone as the progestogen. The composition of the three identically appearing preparations is described in Table 1.

TABLE 1

|  | Preparations | | |
| --- | --- | --- | --- |
|  | Regimen #1 | Regimen #2 | Placebo |
| One tablet each of days 1-5; | | | |
| Mestranol (mcg.) | 12.5 | 25 | --- |
| One tablet each of days 6-13; | | | |
| Mestranol (mcg.) | 25 | 50 | --- |
| One tablet each of days 14-15; | | | |
| Mestranol (mcg.) | 50 | 100 | --- |
| One tablet each of days 16-18; | | | |
| Mestranol (mcg.) | 25 | 50 | --- |
| Norethindrone (mg.) | 1.0 | 1.0 | --- |
| One tablet each of days 19-24: | | | |
| Mestranol (mcg.) | 30 | 60 | --- |
| Norethindrone (mg.) | 1.5 | 1.5 | --- |
| One tablet each of days 25-28; | | | |
| Mestranol (mcg.) | 20 | 40 | --- |
| Norethindrone (mg.) | 0.75 | 0.75 | --- |

In order to obtain data that would be relatively objective in nature, the subjects (105 women participated) recorded the actual number of hot flushes they experienced each day as a main parameter of efficacy. The results are presented in Table 2.

TABLE 2

|  | Group | | |
| --- | --- | --- | --- |
|  | Regimen #1 | Regimen #2 | Placebo |
| Baseline | 2.86 | 2.50 | 1.99 |
| After therapy | 0.82 | 0.16 | 2.24 |
| Difference | 2.04 (±0.51) | 2.34 (±0.52) | −0.25 (±0.32) |

The figures indicate average number of daily hot flushes for subjects in each group immediately before the double-blind study, at the end of the trial, and the difference of the means. A positive difference indicates improvement and a negative one, deterioration. Statistical analysis of these data indicates that both active regimens are significantly different from placebo ($p<0.05$).

In addition, the severity of the hot flushes was estimated for each subject and was subjectively graded on a four-point scale. The results are presented in Table 3.

TABLE 3

|  | Group | | |
| --- | --- | --- | --- |
|  | Regimen #1 | Regimen #2 | Placebo |
| Baseline | 2.24 | 2.24 | 2.24 |
| After therapy | 1.06 | 0.51 | 1.96 |
| Difference | 1.18 (±0.16) | 1.73 (±0.16) | 0.28 (±0.17) |

The figures indicate average severity of hot flushes for subjects in each group immediately before the double-blind study, at the end of the trial, and the difference of the means. Severity was graded as: 3=severe; 2=moderate; 1=mild; 0=no flushes. The average subject in the active groups shifted by one unit or more towards improvement (e.g. from severe to moderate or mild flushes). Statistical analysis of these data confirms that the two active regimens showed a significant improvement ($p<0.05$) over the placebo.

Of the 37 subjects who withdrew from the double-blind study, 26 did so because they became definitely dissatisfied with the symptomatic relief provided by the regimens. Of these 26, 24 were eventually found to have been taking the placebo. Statistical analysis of these figures clearly indicates that the withdrawal rate of the placebo group is significantly different ($p<0.05$) from that of the active regimens.

What is claimed is:

1. A method useful for relieving or preventing menopausal or perimenopausal symptoms in a female human which comprises subjecting said human to a graded sequential estrogen-progestogen regimen during a cycle ranging from about 21 to about 35 days, said regimen comprising:
   (a) the estrogen continuously administered from a day selected from about the first seven of said cycle to a day selected from about the last seven of said cycle, in an effective amount, with gradually increasing daily doses to a first peak dose in about the middle of the estrogen administration period, said first peak dose comprising from about 10 to about 20 percent of the total amount of said estrogen administered during said cycle, and gradually decreasing daily doses from said first peak, and optionally a second peak dose after said first peak dose comprising from about 50 to about 70 percent of said first peak dose; and
   (b) the progestogen administered concomitantly with said estrogen, entirely or in major part after the estrogen first peak dose in an amount sufficient to induce pseudo-menstruation, optionally with a peak dose of about 50 to about 70 percent of the total amount of said progestogen administered.

2. The method according to claim 1 wherein said cycle is 28 days.

3. The method according to claim 1 wherein the estrogen is conjugated estrogen.

4. The method according to claim 1 wherein the estrogen is mestranol.

5. The method according to claim 1 wherein the estrogen administration includes a second peak dose and the progestogen administration includes a peak dose at about the same time as said estrogen second peak dose.

6. The method according to claim 5 wherein the estrogen is administered continuously from day 1 to day 28 and the progestogen is concomitantly administered from day 16 to day 28.

7. The method according to claim 6 wherein the estrogen is conjugated estrogen.

8. The method according to claim 6 wherein the estrogen is mestranol.

9. The method according to claim 8 wherein the progestogen is norethindrone.

10. The method according to claim 9 wherein the mestranol is administered in a total amount ranging from about 400 to about 800 mcg. and the norethindrone is administered in a total amount ranging from about 10 to about 20 mg.

11. The method according to claim 10 wherein the mestranol is administered in graded dosages in consecutive periods of days 1 to 5, days 6 to 13, days 14 to 15, days 16 to 18, days 19 to 24, and days 25 to 28 and the norethindone is administered in graded dosages in consecutive periods of days 16 to 18, days 19 to 24, and days 25 to 28.

12. The method according to claim 1 wherein in a given cycle mestranol is administered at 12.5 mcg. daily for days 1 to 5, at 25 mcg. daily for days 6 to 13, at 50 mcg. daily for days 14 to 15, at 25 mcg. daily for days 16 to 18, at 30 mcg. daily for days 19 to 24, and at 20 mcg. daily for days 25 to 28 and norethindrone is administered at 1 mg. daily for days 16 to 18, at 1.5 mg. daily for days 19 to 24, and at 0.75 mg. daily for days 25 to 28.

13. The method according to claim 1 wherein in a given cycle mestranol is administered at 25 mcg. daily for days 1 to 5, at 50 mcg. daily for days 6 to 13, at 100 mcg. daily for days 14 to 15, at 50 mcg. daily for days 16 to 18, at 60 mcg. daily for days 19 to 24, and at 40 mcg. daily for days 25 to 28 and norethindrone is administered at 1 mg. daily for days 16 to 18, at 1.5 mg. daily for days 19 to 24, and at 0.75 mg. daily for days 25 to 28.

14. A composition useful for preventing or relieving menopausal or perimenopausal symptoms in a female human which comprises graded sequential estrogen-progestogen components in admixture with a pharmaceutically acceptable non-toxic carrier, said components arranged in a regimen suitable for administration in accordance with claim 1.

References Cited

Roland, M. et al.: Geriatrics 27:138–145, May 1972, Perimenopausal Patients; Treatment with Continual Escalating-Dose Synthetic Estrogen with Added Progestogen.

De Cecco, L.: Minerva Ginecol. 23:898–901, Nov. 15, 1971, Substitutive Therapy with Gradual Doses of Estrogens.

Scott, M.M.: Nebr. State Med. J. 57:16–21, January 1972, Full Replacement Therapy of the Menopause.

Martin, P. L. et al.: Am. J. Obstet. Gynecol. III:178–186, Sept. 15, 1971, Graded Sequential Therapy in the Menopause: A Double-Blind Study.

Samaja, B.A.: Ann. Obstet. Ginec. 91:182–196, March 1969, Sequential Triphasic Therapy in the Menopause.

Gonzalez, Gutierrez J. T.: Ginec. Obstet. Mex. 24: 531–7, May 1969, Personal Experience in the Management of the Post-Menopausal Patient Using Sequential 11 Plus 10 Therapy (Mestranol 30 mcg. and Chlormadinone 1 mg. Plus Mestranol 80 mcg.

Cortes Gallegos, V. et al.: Medicina (Mex.) 45:276–282, June 25, 1965, Treatment of the Menopausal Syndrome with Sequential Estrogen and Progestogen Therapy.

Bakke, V. J.: Pacif. Med. Surg. 73:200–5, May–June 1965, A Double-Blind Study of a Progestin-Estrogen Combination in the Management of the Menopause.

SHEP K. ROSE, Primary Examiner